INVENTOR.
DAVID D. KAYS
BY
D. Gordon Argus
ATTORNEY

United States Patent Office 3,672,960
Patented June 27, 1972

3,672,960
MULTIPLE EFFECT DISTILLATION SYSTEMS
David D. Kays, Claremont, Calif., assignor to Aerojet-General Corporation, El Monte, Calif.
Filed Feb. 10, 1970, Ser. No. 10,232
Int. Cl. B01d 3/00, 3/02
U.S. Cl. 203—11                                    4 Claims

ABSTRACT OF THE DISCLOSURE

According to the multiple effect evaporation process disclosed herein, a feed liquor is sequentially operated on in a plurality of serially arranged evaporator effects. Hot vapor directed into one effect transfers heat to liquor in the effect to vaporize part of the liquor and to enrich the remainder of the liquor to form a concentrate. The hot vapor condenses on a heat transfer surface so that some of the hot vapor forms a condensate. The enriched liquor (concentrate) and the vapor from the liquor are forwarded to the next effect in such a manner that the vapor from the liquor transfers heat to the enriched liquor to vaporize part of the enriched liquor, thereby enriching the remainder of the enriched liquor. More vapor is condensed in each effect. The feed liquor is preheated by spontaneously vaporizing some of the enriched liquor from each effect to cool the remainder of the enriched liquor, and by transferring heat from the vapor from the enriched liquor to the feed liquor, thereby heating the feed liquor. The feed liquor is also preheated by condensing hot vapor from each effect on heat exchange tubes containing the effect of feed liquor. The feed liquor is also heated by spontaneously vaporizing a portion of the condensed vapor in the presence of heat exchange tubes carrying feed liquor to heat the feed liquor. Also, as concentrate is forwarded to each effect, it is spontaneously vaporized to cool some of the concentrate thereby establishing a temperature differential between the vapors from the previous effect and the cooled concentrate to effectuate heat transfer between the hot vapors and the cooled concentrate.

Figure 1A:
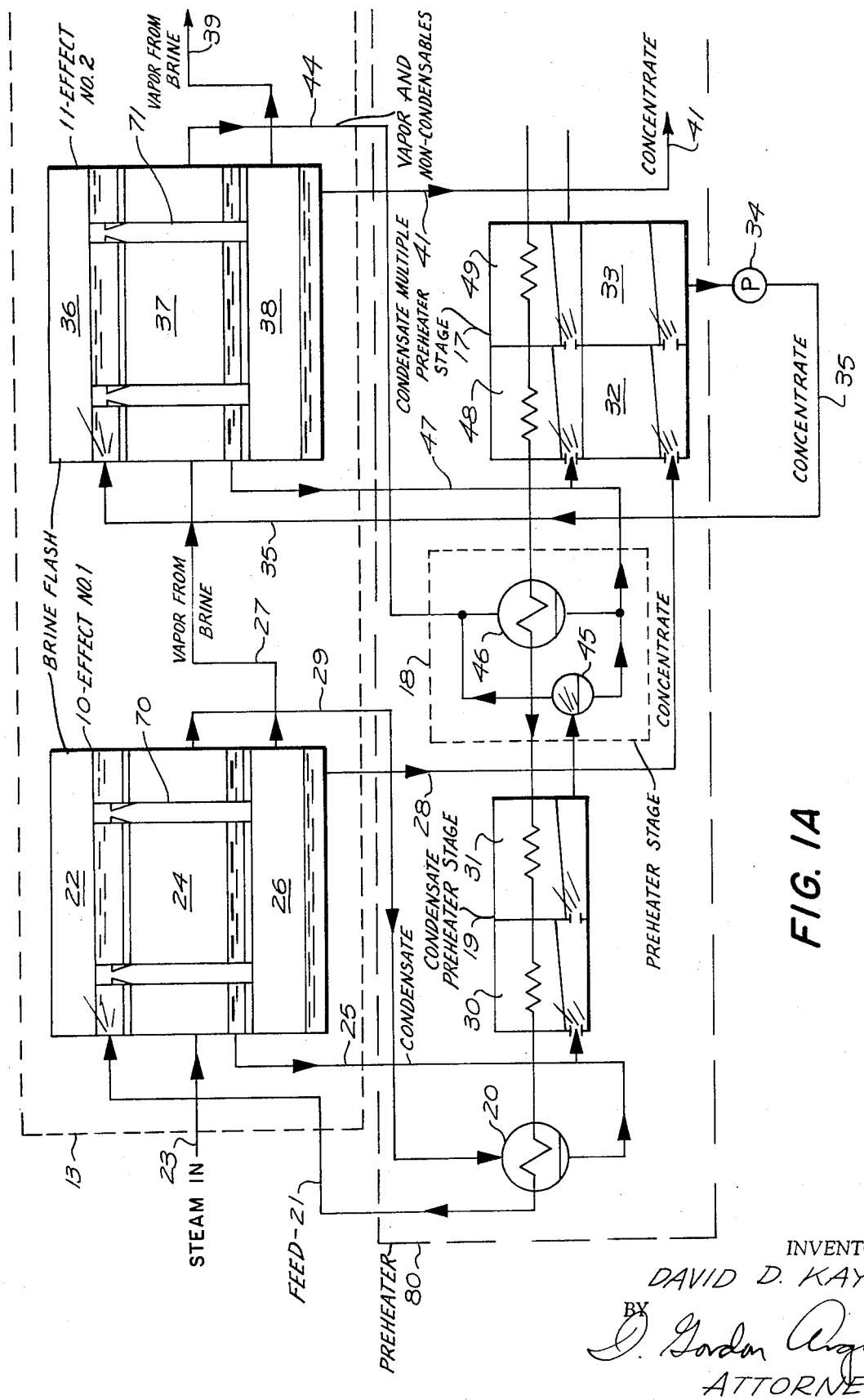

This invention relates to distillation process, and particularly to multiple effect distillation process wherein the feed liquor is preheated by condensing hot vapor in stages before being introduced into the evaporator.

Multiple effect evaporators are characterized by the use of several evaporator effects serially arranged so that the feed liquor is operated on by each evaporator effect sequentially. Ordinarily, each evaporator effect utilizes a falling film evaporator wherein the liquor forms a thin film on a heat transfer wall and flows by means of gravity down one side thereof. Hot vapor is applied to the opposite side of the heat transfer wall so that condensation of the vapor occurs on the one side and evaporation of the liquor occurs on the other. The hot vapor condensed on one surface of the wall transfers heat to the thin film of liquor on the opposite side thereof to thereby vaporize some of the liquor. The enriched liquor (concentrate) is fed to the next subsequent effect, and the hot vapor is fed to the subsequent effect where it condenses on another heat transfer wall, and the process is repeated.

Prior multiple effect evaporation systems have utilized a process scheme wherein a concentrate and a condensate were both transferred to a feed heater chamber having the same pressure as in the evaporator effect to which the concentrate was to go next. Portions of the concentrate and the condensate were spontaneously evaporated to cool the concentrate and condensate to the lower saturation temperature associated with the next effect. Ordinarily, feed heating in such systems has only been accomplished in separate condensing heaters, at least one of which was associated with each effect so that each effect supplied heat to the feed heating system. In such systems, the heating vapor was withdrawn from the evaporator and fed to the feed heaters. In more advanced prior art systems the concentrate and condensate were allowed to flash through several steps in the preheater until the concentrate reached the pressure associated with the next effect, and it was then introduced into such subsequent effect.

It is an object of the present invention to provide a multiple effect evaporator process wherein the liquor is more efficiently concentrated than in prior processes.

It is another object of the present invention to provide a self-sustaining multiple effect evaporator process wherein the feed liquor is preheated by warmer products from each effect of the process.

It is another object of the present invention to provide a multiple effect distillation process wherein hot concentrate and hot condensate are separately spontaneously evaporated one or more times in the presence of feed liquor to heat the feed liquor and to cool the condensate and to cool the concentrate to the saturation temperature associated with the feed heater stage, and thereafter spontaneously evaporating the concentrate as it enters the next effect of the evaporator.

In accordance with the present invention, several serially interconnected evaporator effects are arranged with a preheater having at least two stages for one or more of the effects. Concentrate and condensate from the serially arranged effects or from previous feed heater stages are flashed or spontaneously evaporated in the presence of the feed liquor to form a vapor which heats the feed liquor and to cool the remaining liquid to the saturation temperature in the feed heater stage. The concentrate from a feed heater may be flashed through one or more stages of a feed heater and is thereafter flashed into the next evaporator effect to be operated on therein. The condensate in the feed heater continues through one or more additional stages to preheat the feed liquor.

One feature of the invention resides in the fact that the flashing through one or more stages between evaporator effects is thermodynamically more efficient than a single flashing stage and also improves the temperature potential available for heat transfer of heat to the feed liquor.

Another feature of the present invention resides in the provision of fluid communication between an equilibrium stage of the preheater and an associated evaporator effect so that the pressure and temperature associated in the equilibrium stage of the preheater is substantially the same as that associated with the evaporator effect.

Another feature of the present invention resides in the maintenance of high steam velocity in the evaporator effects by directing steam from the evaporator effects to the feed heater where the brine is not flashed, thereby carrying away non-condensable materials which could otherwise reduce the efficiency of heat transfer of the evaporation system.

Another feature of the present invention resides in the withdrawal of hot concentrate from a feed heater stage whose equilibrium pressure and temperature is greater than the evaporation pressure and temperature in the evaporator effect to which the feed liquor is to be heated so that the liquor enters the evaporator in a superheated condition relative to the evaporator so that the liquor flashes to produce some vapor, thereby cooling the remainder of the liquid concentrate.

Figure 1B:
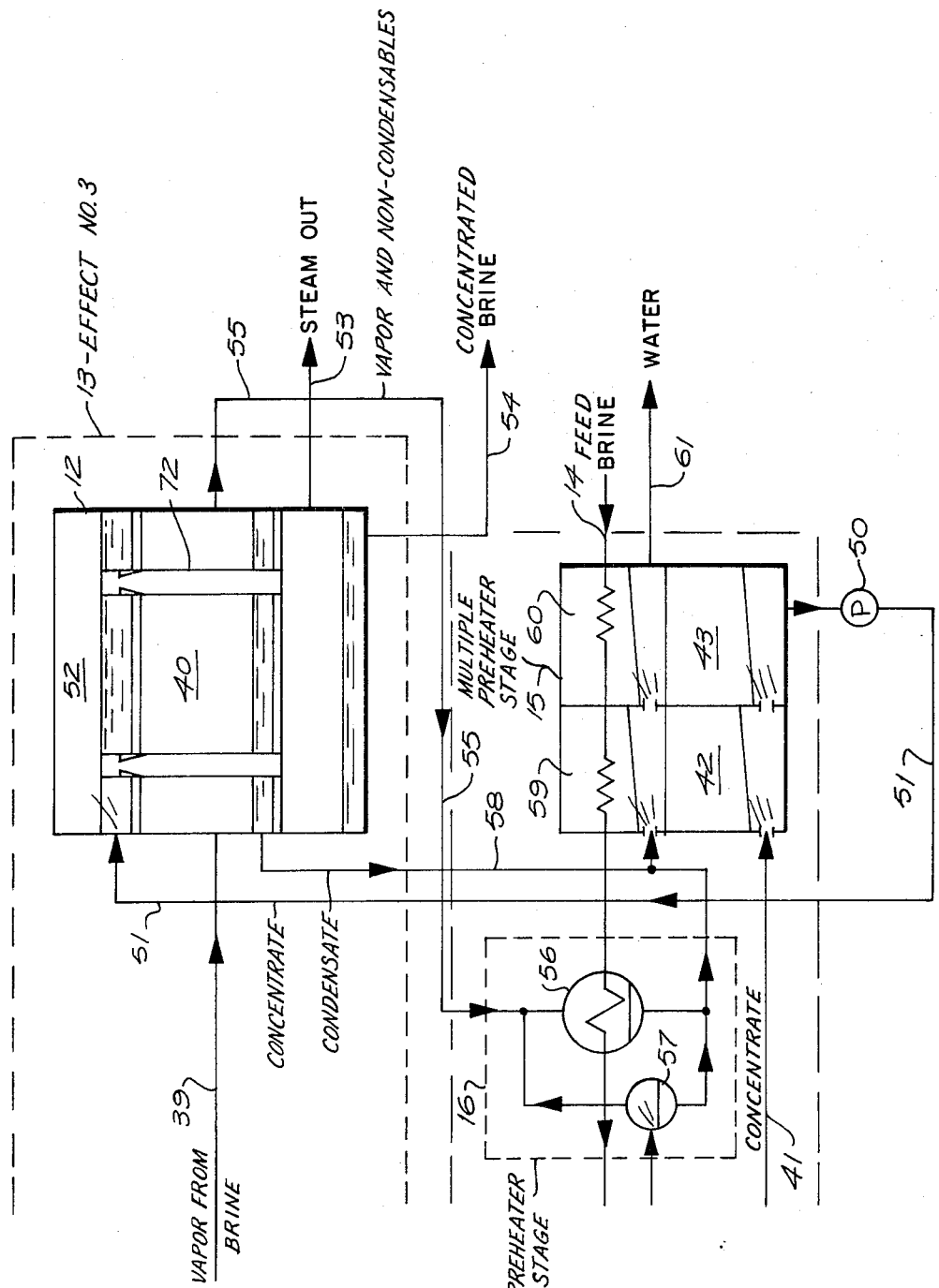

The above and other features of this invention will be more fully understood from the following detailed description and the accompanying drawing, in which:

FIGS. 1A and 1B, taken together, is a schematic diagram of a multiple effect evaporator system in accordance with the presently preferred embodiment of the present invention.

Referring to the drawing there is illustrated a multiple effect evaporator system according to the presently preferred embodiment of the present invention utilizing a plurality of evaporator effects, 10, 11 and 12, which together form evaporator 13. It is to be understood that the evaporator 13 may have any number of identical effects 10–12, and that three evaporator effects are illustrated simply for purposes of example and not of limitation. Evaporator 13 may be of the type described and claimed in the copending patent application Ser. No. 10,231 of Kurt F. Frank et al., entitled "Multiple Effect Evaporators" filed of even date herewith and assigned to the same assignee as the present invention.

The liquor to be concentrated is introduced to the system through conduit 14 through preheater 80 having several preheater stages 15, 16, 17, 18, 19 and 20 wherein the feed liquor is heated prior to introduction to effect 10. As will be more fully understood hereinafter, stages 15 and 17 are multiple stages which provide heating from concentrate as well as condensate and stage 19 may be several stages of preheating from hot condensate. Stages 15–20 may be housed together in a unitary housing forming preheater 80. The feed liquor is excited through conduit 21 and into the upper region 22 of effect 10. The system is designed so that the pressure in region 22 is lower than that in stage 20 of the preheater so that as the feed liquor is introduced into region 22 of effect 10 it flashes and a portion of the liquor spontaneously evaporates, thereby cooling the remainder of the liquor to the saturation temperature associated with the pressure in region 22.

For purposes of the present invention, the liquor will be considered as a saline water or brine. Hot clean vaporized water or steam is introduced through conduit 23 into the region 24 of effect 10. Although the hot vapors may be different for other types of feed liquor, it is essential that the vapor be of the type which would be derived by evaporating the feed liquor. Region 24 contains a bundle of tubes 70 having heat transfer surfaces. By way of example, tubes 70 may be fabricated in the manner described in the copending application of Ernest R. Roberts, Ser. No. 885,116 entitled "Dimpled Heat Transfer Walls for Distillation Apparatus" filed Dec. 15, 1969 and assigned to the same assignee as the present invention. The liquor or brine in region 22 flows down the interior surface of each tube 70 and forms a thin film on the interior surface of each tube of the bundle in region 24.

Steam condenses on the outer surface of each tube thereby transferring its heat to the thin film of liquor in the tubes to vaporize some of the liquor or brine in the tubes. The condensed steam deposited on the outer surfaces of the tubes in region 24 is carried out through conduit 25 to preheater 19 for purposes to be hereinafter described. The concentrated liquor and the vapor from the liquor in the tubes passes through the tubes and into the region 26 below the tubes where the vapor is carried out through conduit 27 to the subsequent effect 11. The enriched liquor or brine (concentrate) is carried out via conduit 28 to preheater 17 for purposes to be hereinafter explained.

The portion of the steam which is not condensed in region 24 of effect 10 is carried out through conduit 29 to preheater 20 wherein it preheats the feed liquor received from preheater 19. The condensed steam from preheater 20 is then combined with the condensed vapor (condensate) from region 24 taken via conduit 25 and is flashed, or spontaneously vaporized into region 30 of preheater 19. Pressure within preheater 20 is approximately the same as the pressure in region 24 of effect 10 and is higher than the pressure in region 30 of preheater 29. Hence, the condensate is flashed as it enters region 30 of preheater 19 thereby spontaneously vaporizing some of the condensate to thereby cool the remainder of the condensate to the saturation temperature associated with a lower pressure in region 30. The vaporized condensate in region 30 transfers latent heat to the feed liquor passing therethrough. The liquid condensate in region 30 flashes into region 31 which is at a lower pressure than region 30 to thereby spontaneously vaporize some of the condensate while cooling the remainder of it. The vaporized condensate transfers latent heat to the feed liquor, thereby condensing the vapor. The condensate liquid is carried out to condenser flashes 45 in preheater 18.

The condensate in region 31 is forwarded to condensate flash region 45 of preheater 18. The details of preheater 18, like that of preheater 16, are more fully described in the copending application of David D. Kays et al., Ser. No. 10,233, entitled "Preheaters," filed of even date herewith and assigned to the same assignee as the present invention. Region 45 of preheater 18 is at approximately the same pressure and temperature as region 37 of the second evaporator effect 11. Due to the superheated condition of condensate entering region 45, the condensate spontaneously vaporizes thereby forming a vapor which combines with vapor from region 37 of evaporator effect 11 and is fed to vapor condensing region 46 of preheater 18. In region 46 of preheater 18, the hot vapor from region 37 of effect 11 and the hot vapor from region 45 of preheater 18 heats the feed liquor passing therethrough by condensing on the outer surface of suitable heat transfer walls (not shown). The condensate so formed combines with the condensate flowing from region 45 and is fed to region 48 of preheater 17. As described in said aforementioned Kays et al. application, regions 45 and 46 of preheater 18 may be substantially the same chamber of a single housing. Reference may be made to said application of Kays et al. for further details of preheaters 16 and 18.

The hot condensate from region 37 of effect 11 and condensate from preheater 18 combine and flash evaporate through several stages 48 and 49 of preheater 17. The operation of regions 48 and 49 of preheater 17 is substantially identical to the operation of regions 30 and 31 of preheater 19, described above, and reference may be had to the operation thereof for further understanding of the heating of the feed liquor in regions 48 and 49 of preheater 17.

Concentrate or enriched liquor in region 26 of effect 10 is carried via conduit 28 and flashed into region 32 of preheater 17 so that some of the liquor vaporizes, the vapor transferring heat to the feed liquor in the preheater. The remainder of the liquid cools to the saturation temperature associated with the lower pressure in region 32 and thereafter flashes into region 33 of preheater 17 to again heat the feed liquor. The remaining liquor is thereafter pumped via pump 34 and conduit 35 into the upper portion 36 of effect 11. The hot vapor from the liquor from regions 32 and 33 condenses on heat transfer surfaces associated with the feed liquor to transfer heat to the feed liquor, the condensate from such vapors being collected in the sumps or trays associated with regions 48 and 49 to be carried off with the condensate from previous stages. In this manner, it can be understood that the quantity of concentrate diminishes with each subsequent preheater stage whereas the quantity of condensate increases.

The pressure in region 36 of effect 11 is lower than that of region 33 of preheater 17 so that as the liquid brine or concentrate enters region 36 it flashes thereby spontaneously vaporizing some of the liquid and cooling the remainder to the saturation temperature associated with the pressure. The hot vapor from region 26 of effect 10 enters region 37 of effect 11 via conduit 27.

In order to establish a sufficient temperature differential between hot vapor from region 26 of effect 11 and the liquid in region 36 of effect 11, the spontaneous vaporization of a portion of the liquid as it enters region 36 causes cooling of a portion of the liquid which in turn flows in a thin film down the vaporization tubes in region 37. Hence, the temperature potential is obtained between the liquid in the tubes and the vapor outside of the tubes so that some of the liquid within the tubes is vaporized, which vapors pass through region 38 into conduit 39 for feeding to region 40 of the next effect. The concentrated brine (concentrate) is taken out via conduit 41 and is flashed through several stages 42 and 43 of preheater 15 to heat the feed liquor in a manner heretofore described. Also, vapor from region 37 combines with vapor formed from flashing condensate in preheater 18 to heat the feed liquor as heretofore described. Preheater 16 receives superheated condensate from region 49 of preheater 17 and operates in a manner similar to preheater 18 to heat the feed liquor, the remaining condensate being forwarded to regions 59 and 60, sequentially to continue to heat the feed liquor. Preheater 15 operates in a manner similar to preheater 17.

The concentrate from region 43 of preheater 15 is pumped out via pump 50 and conduit 51 and into the upper region 52 of effect 12 where it is flashed into the lower pressure in region 52 than in region 43 of preheater 15. When the concentrate is flashed, some of the liquid vaporizes and the remainder cools as hereinbefore described. The cooled liquid flows down the interior surface of tubes 72 and forms a thin film on the tubes so that the hot vapors from region 38 of effect 11 operate on the outer surfaces of the tubes in region 40 to condense on the tubes thereby vaporizing some of the liquid in the tubes. The liquid vapor in tubes is taken via conduit 53 as output steam, and liquid brine is taken out through conduit 54 as heretofore described. Excess vapor is taken out via conduit 55 and fed to preheater 16 wherein it operates in region 56 to heat feed liquor. The liquid is combined with condensed vapor from conduit 58 and is flashed into region 59 of preheater 15 and thereafter flashed into region 60 of preheater 15 to heat the feed liquor, as described. The condensate, in the form of relatively clean water, for example, is taken out via conduit 61.

From the foregoing it may be understood that the brine or concentrate from one effect is flashed through several stages to preheat the feed liquor. Thereafter, the brine is flashed into equilibrium in the subsequent effect to thereby cool some of the liquid to establish a temperature differential between the cool liquid and the hot vapor from the previous effect. The hot vapor from each effect vaporizes some of the liquid in the subsequent effect to thereby derive the hot vapors necessary for the next effect, and the concentrated brine or concentrate is taken out, flashed through several flash tanks to further preheat the feed liquor and cool the concentrate and thereafter is fed to the next effect.

From the foregoing, it is to be understood that the pressure of the various regions of each effect should be established as follows (with respect to effect 11):

$$P_{26}=P_{37}=P_{45}=P_{46}>P_{48}>P_{49}>P_{57}$$

and $$P_{26}>P_{32}>P_{33}>P_{36}=P_{38}$$

Where $P_{26}$, $P_{32}$, $P_{33}$, $P_{36}$, $P_{37}$, $P_{38}$, $P_{45}$, $P_{46}$, $P_{48}$, $P_{49}$ and $P_{57}$ are the pressures in regions 26, 32, 33, 36, 37, 38, 45, 46, 48, 49 and 57, respectively. These pressures and the associated temperatures may be established by system design and maintained by controlling the pressure of the inlet steam through conduit 23, the inlet liquor through conduit 14, and the outlet steam, concentrate and condensate through conduits 53, 54, and 61, respectively.

One feature of the present invention resides in the fact that uncondensed steam from each evaporator effect leaves the region of the tube bundle at a relatively high velocity to carry away non-condensable material to a preheater. Hence, high velocity steam carries away non-condensable material from each evaporator effect through lines 29, 44 and 55, respectively, so that the non-condensable material is forwarded into the feed heater sections 20, 46, 56, respectively, where the steam is condensed.

The present invention thus provides a self-sustaining evaporator system which provides positive flow of vapor through evaporator effects. The spontaneous evaporation of the condensate and of the concentrate through several stages, especially in a preheater stage, serves to heat the evaporator feed. The vapor flow is substantially turbulent so that non-condensable materials in the effects are removed with the vapor from the system. By maintaining the flow turbulent, the non-condensable materials are removed with the vapor and the heat transfer coefficient of the system is maintained at a maximum thereby maximizing the performance of the system.

This invention is not to be limited by the embodiments shown in the drawing and described in the description, which is given by way of example and not of limitation.

What is claimed is:

1. In an evaporation process having a multiple effect evaporator, wherein a liquor is evaporated and concentrated in a plurality of effects including a first effect with respect to liquid flow, each having a condensing side and an evaporating side to form a concentrate and a vapor which vapor is condensed on the condensing side of the subsequent effect and, wherein feed liquor to the evaporator is preheated by indirect heat exchange in a preheater, the improvement comprising:

removing concentrate from a prior effect of the evaporator with respect to liquor flow and in which prior effect the concentrate is produced by indirectly heating feed liquor with vapor to provide vapor condensate which is removed and passing the removed concentrate to a concentrate flash region of the preheater maintained at a pressure intermediate to that of the evaporating side of the prior effect and that of the evaporating side of the subsequent effect and flashing the concentrate in said region to provide vapor and further enriched concentrate;

condensing the flashed concentrate vapor in another region in said preheater to transfer heat by indirect heat exchange to the feed liquor prior to its entrance into the first effect and combining the condensed vapor from the flashed concentrate with the vapor condensate removed from the prior effect; and passing the enriched concentrate from the preheater to the subsequent effect of the evaporator and there partially flash evaporating the concentrate into the evaporating side of said subsequent effect.

2. An evaporating process in accordance with claim 1 wherein the preheater contains more than one intermediate-pressure region through which regions the concentrate is sequentially passed with flashing and heat transfer to the feed liquor by condensing the flashed vapor which is generated in each such region and with the pressure of the last region being less than that of the first region but greater than the pressure of the subsequent effect.

3. A process in accordance with claim 1 wherein said feed liquor is further preheated by partially flash evaporating the condensate from the prior effect in at least one region of the preheater to provide a vapor, condensing the vapor from the condensate by transferring heat from the vapor to the feed liquor by indirect heat exchange, and recombining the condensed vapor from the condensate with the unvaporized condensate.

4. A process in accordance with claim 1 wherein condensate is removed from the condensing side of the subsequent effect of the evaporator and is passed to the heat exchange region of the preheater and there flashing a portion of the condensate to provide a condensate vapor; and condensing this flashed condensate vapor by transferring heat indirectly therefrom to the feed liquor and recombining the condensed vapor from the flashed condensate with the unvaporized condensate.

References Cited

UNITED STATES PATENTS

| | | | |
|---|---|---|---|
| 2,750,999 | 6/1956 | De Vries | 159—18 |
| 2,896,705 | 7/1959 | Ramen | 159—47 WL |
| 2,941,590 | 6/1960 | Rosenblad | 159—47 WL |
| 3,179,159 | 4/1965 | Jafs | 159—47 WL |
| 3,351,120 | 11/1967 | Goeldner et al. | 159—13 B |
| 3,414,038 | 12/1968 | Laakso | 159—17 |
| 3,322,648 | 5/1967 | Kays et al. | 202—174 |
| 3,372,096 | 3/1968 | Tidball | 202—173 |
| 3,398,059 | 8/1968 | Cane et al. | 202—173 |
| 3,468,761 | 9/1969 | Stalcup | 202—173 |
| 3,486,985 | 12/1969 | McGrath | 202—173 |
| 3,533,917 | 10/1970 | Williams | 202—173 |

FOREIGN PATENTS

| | | | |
|---|---|---|---|
| 1,092,442 | 11/1960 | Germany | 159—Dig 22 |
| 1,215,046 | 4/1902 | France | 159—17 |

NORMAN YUDKOFF, Primary Examiner

J. SOFER, Assistant Examiner

U.S. Cl. X.R.

202—174, 236; 203—71, 72, 80; 159—17